United States Patent
Gemar et al.

(10) Patent No.: US 11,435,804 B2
(45) Date of Patent: Sep. 6, 2022

(54) ACTIVE POWER MANAGEMENT

(71) Applicant: QUALCOMM Incorporated, San Diego, CA (US)

(72) Inventors: Jeffrey Gemar, San Diego, CA (US); Ambudhar Tripathi, San Diego, CA (US); Philippe Martin, Roquefort les Pins (FR)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 16/790,431

(22) Filed: Feb. 13, 2020

(65) Prior Publication Data

US 2021/0255689 A1   Aug. 19, 2021

(51) Int. Cl.
| | |
|---|---|
| *G06F 1/3228* | (2019.01) |
| *G06F 1/04* | (2006.01) |
| *G06F 15/78* | (2006.01) |
| *G06F 13/16* | (2006.01) |
| *G06F 1/3246* | (2019.01) |

(52) U.S. Cl.
CPC .............. *G06F 1/3228* (2013.01); *G06F 1/04* (2013.01); *G06F 1/3246* (2013.01); *G06F 13/161* (2013.01); *G06F 15/7807* (2013.01)

(58) Field of Classification Search
CPC ........ G06F 1/3228; G06F 1/04; G06F 1/3246; G06F 13/161; G06F 15/7807
See application file for complete search history.

(56) References Cited

U.S. PATENT DOCUMENTS

| | | | | |
|---|---|---|---|---|
| 9,489,032 | B2 * | 11/2016 | Teoh | G06F 1/3234 |
| 9,965,220 | B2 * | 5/2018 | Alavoine | G06F 12/08 |
| 2013/0007492 | A1 * | 1/2013 | Sokol, Jr. | G06F 1/3206 713/322 |
| 2013/0111242 | A1 * | 5/2013 | Heller | G06F 1/3287 713/323 |
| 2013/0275791 | A1 * | 10/2013 | Ulmer | G06F 1/3287 713/323 |
| 2013/0290758 | A1 * | 10/2013 | Quick | G06F 1/3203 713/323 |
| 2014/0372777 | A1 * | 12/2014 | Reller | G06F 13/161 710/305 |
| 2017/0212581 | A1 * | 7/2017 | Park | G06F 13/16 |
| 2021/0255689 | A1 * | 8/2021 | Gemar | G06F 1/3246 |

\* cited by examiner

*Primary Examiner* — Nimesh G Patel
(74) *Attorney, Agent, or Firm* — Qualcomm Incorporated

(57) ABSTRACT

In some aspects, the present disclosure provides a method for power management. The method includes receiving, by a power management unit (PMU), signaling indicative of a first plurality of latency durations from a first plurality of clients, each of the first plurality of latency durations corresponding to one of the first plurality of clients, wherein each of the first plurality of clients is configured to utilize a first shared resource for communication of data. In certain aspects, the method also includes selecting, by the PMU, a first latency duration from the first plurality of latency durations based on a determination that the first latency duration is the shortest latency duration of the first plurality of latency durations, and transitioning, by the PMU, the first shared resource from an active state to the first idle state.

30 Claims, 4 Drawing Sheets

ACTIVE POWER MANAGEMENT

BACKGROUND

Field of the Disclosure

The teachings of the present disclosure relate generally to power management operations, and more particularly, to techniques for actively reducing power consumption of shared resources.

Description of the Related Art

Integrated circuits (e.g., systems on a chip (SoC)) may include a broad range of processing subsystems on a single chip. For example, an SoC may include a plurality of circuit components, such as cores, execution engines, hardware accelerators, etc., all having independent and/or inter-dependent features. Accordingly, such an arrangement on a single chip requires a common chassis infrastructure (e.g., bus resources, such as networks on a chip (NoCs)) to complete various workloads of the circuit components.

However, the use of the common chassis by the multiple components is typically uncoordinated. For example, some circuit components may have strict requirements for data latency and reliability, while other components may have less stringent data requirements. As such, the common chassis is typically required to stay in an active state to accommodate the data requirements of the various components. This creates a steady power drain on any devices using the integrated circuit. Such usage can provide a negative user experience if the devices are battery powered. Moreover, as the number of circuit components of integrated circuits continues to increase, so too does the amount of power required to keep the common chassis in an active state.

Accordingly, as integrated circuits become more sophisticated, there exists a need for further improvements integrated circuit technology.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In certain aspects, the disclosure provides for a method of managing power on a system on a chip (SoC), the method comprising receiving, by a power management unit (PMU), signaling indicative of a first plurality of latency durations from a first plurality of clients, each of the first plurality of latency durations corresponding to one of the first plurality of clients, wherein each of the first plurality of clients is configured to utilize a first shared resource for communication of data. In some examples, the method includes selecting, by the PMU, a first latency duration from the first plurality of latency durations based on a determination that the first latency duration is the shortest latency duration of the first plurality of latency durations. In some aspects, the method includes determining, by the PMU, a first idle state of a plurality of idle states, the first idle state corresponding to the first latency duration. In some aspects, the method includes transitioning, by the PMU, the first shared resource from an active state to the first idle state.

In certain aspects, the disclosure provides for a power management unit (PMU), comprising a memory and a processor communicatively coupled to the memory. In some examples, the processor is configured to receive signaling indicative of a first plurality of latency durations from a first plurality of clients, each of the first plurality of latency durations corresponding to one of the first plurality of clients, wherein each of the first plurality of clients is configured to utilize a first shared resource for communication of data. In some examples, the processor is configured to select a first latency duration from the first plurality of latency durations based on a determination that the first latency duration is the shortest latency duration of the first plurality of latency durations. In some examples, the processor is configured to determine a first idle state of a plurality of idle states, the first idle state corresponding to the first latency duration. In some examples, the processor is configured to transition the first shared resource from an active state to the first idle state.

In certain aspects, the disclosure provides for a non-transitory computer-readable storage medium that stores instructions that when executed by a processor of an apparatus cause the apparatus to perform a method for active power management of shared resources on a system on a chip (SoC). In some examples, the method comprises receiving signaling indicative of a first plurality of latency durations from a first plurality of clients, each of the first plurality of latency durations corresponding to one of the first plurality of clients, wherein each of the first plurality of clients is configured to utilize a first shared resource for communication of data. In some examples, the method also includes selecting a first latency duration from the first plurality of latency durations based on a determination that the first latency duration is the shortest latency duration of the first plurality of latency durations. In some examples, the method also includes determining a first idle state of a plurality of idle states, the first idle state corresponding to the first latency duration. In some examples, the method also includes transitioning the first shared resource from an active state to the first idle state.

In certain aspects, the disclosure provides for a power management unit (PMU) comprising means for receiving signaling indicative of a first plurality of latency durations from a first plurality of clients, each of the first plurality of latency durations corresponding to one of the first plurality of clients, wherein each of the first plurality of clients is configured to utilize a first shared resource for communication of data. In some examples, the PMU includes means for selecting a first latency duration from the first plurality of latency durations based on a determination that the first latency duration is the shortest latency duration of the first plurality of latency durations. In some examples, the PMU includes means for determining a first idle state of a plurality of idle states, the first idle state corresponding to the first latency duration. In some examples, the PMU includes means for transitioning the first shared resource from an active state to the first idle state.

Aspects of the present disclosure provide means for, apparatus, processors, and computer-readable mediums for performing techniques and methods for actively reducing power consumption of shared resources. For example, shared resources may include a system chassis (e.g., networks on a ship (NoC) interfaces, bus interfaces, physical input/outputs (I/Os), etc.), memory mappers, memory controllers, memory resources, etc.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
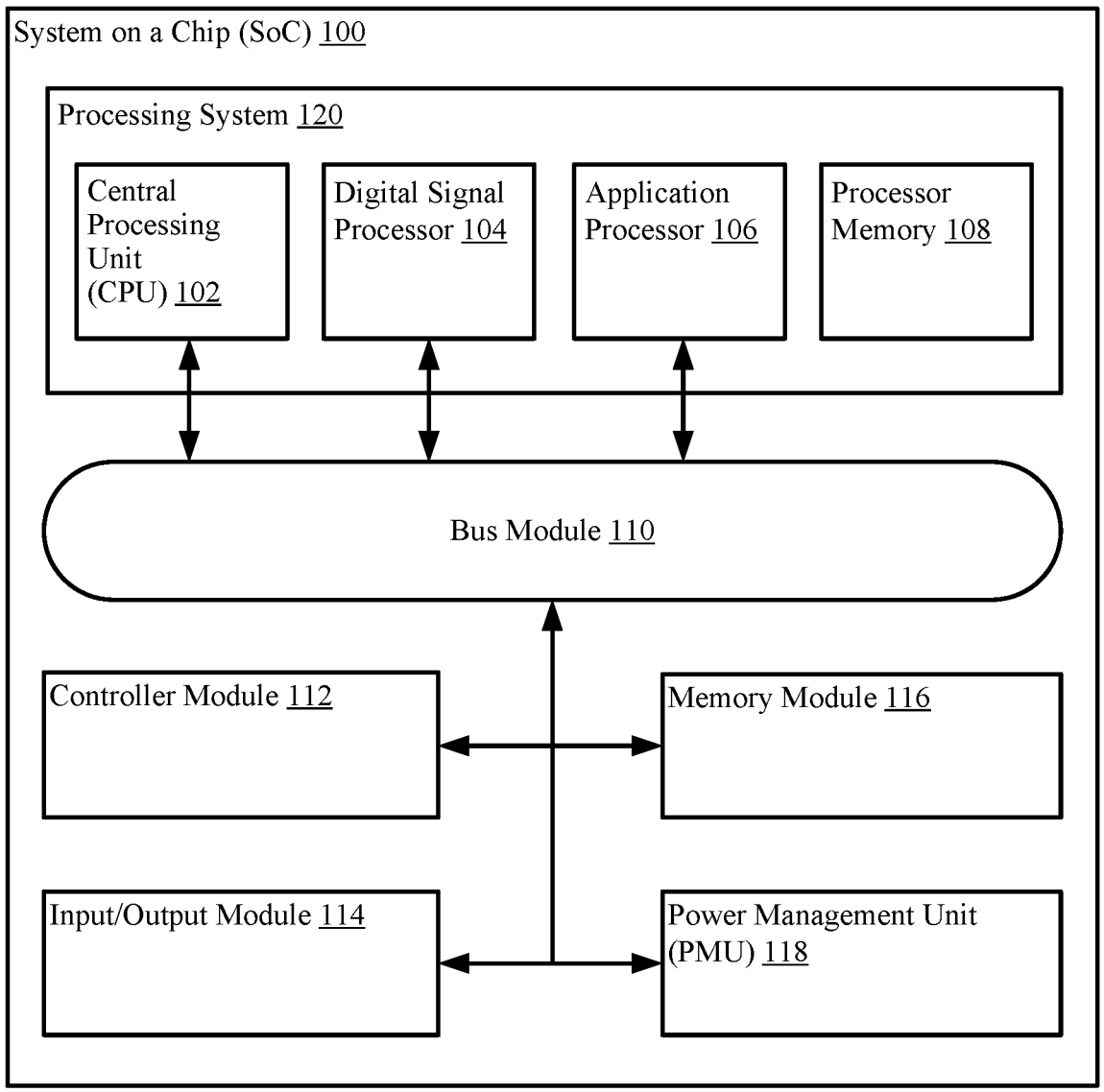
FIG. 1 is a block diagram illustrating an exemplary system-on-chip (SoC) integrated circuit in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with various other embodiments discussed herein.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), processor cores, memory blocks (e.g., ROM, RAM, Flash, etc.), execution engines, hardware accelerators, and resources (e.g., timers, voltage regulators, oscillators, etc.), any or all of which may be included in one or more cores.

A number of different types of memories and memory technologies are available or contemplated in the future, all of which are suitable for use with the various aspects of the present disclosure. Such memory technologies/types include phase change memory (PRAM), dynamic random-access memory (DRAM), static random-access memory (SRAM), non-volatile random-access memory (NVRAM), flash memory (e.g., embedded multimedia card (eMMC) flash, flash erasable programmable read only memory (FEPROM)), pseudostatic random-access memory (PSRAM), double data rate (DDR) synchronous dynamic random-access memory (DDR SDRAM), and other random-access memory (RAM) and read-only memory (ROM) technologies known in the art (e.g., single data rate (SDR) and quad data rate (QDR)). SDRAM memories may include a type 1 SDRAM memory, type 2 SDRAM memory, type 3 SDRAM memory, or a type 4 SDRAM memory.

Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, global positioning system (GPS) processors, display processors, etc.), complex memory systems, intricate electrical interconnections (e.g., buses and/or fabrics), and numerous other resources that execute complex and power intensive software applications (e.g., video streaming applications, etc.).

FIG. 1 is a block diagram illustrating an exemplary system-on-chip (SoC) 100 suitable for implementing various aspects of the present disclosure. The SoC 100 includes a processing system 120 that includes a plurality of heterogeneous processors such as a central processing unit (CPU) 102, a digital signal processor 104, an application processor 106, and a processor memory 108. The processing system 120 may include one or more cores, and each processor/core may perform operations independent of the other processors/cores. The processors 102, 104, and 106 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The processing system 120 is interconnected with one or more controller module(s) 112, input/output (I/O) module(s) 114, memory module(s) 116, and power management unit(s) (PMUs) 118 via a bus module 110 which may include an array of reconfigurable logic gates and/or implement bus architecture (e.g., CoreConnect, advanced microcontroller bus architecture (AMBA), etc.). Bus module 110 communications may be provided by advanced interconnects, such as high performance networks on chip (NoCs). The bus module 110 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. The bus module 110 may include a multi-level bus system including, for example, one or more aggregate NoCs serving a plurality of clients (e.g., a plurality of modules and/or processors), and one or more main NoCs serving the aggregate NoCs and one or more clients. In some cases, the bus module 110 may implement an arbitration scheme to prevent multiple master components from attempting to drive the bus simultaneously.

The controller module 112 may be a specialized hardware module configured to manage the flow of data to and from the memory module 116, the processor memory 108, or a memory device located off-chip (e.g., a flash memory device). In some examples, the memory module may include a UFS host device configured to receive various memory commands from multiple masters, and address and communicate the memory commands to a memory device. The multiple masters may include processors 102, 104, and 106, and/or multiple applications running on one or more of the processors 102, 104, and 106. The controller module 112 may comprise one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The I/O module 114 is configured for communicating with resources external to the SoC 100. For example, the I/O module 114 includes an input/output interface (e.g., a bus architecture or interconnect) or a hardware design for performing specific functions (e.g., a memory, a wireless device, and a digital signal processor). In some examples, the I/O module 114 includes circuitry to interface with peripheral devices, such as a memory device located off-chip.

The memory module 116 is a computer-readable storage medium implemented in the SoC 100. The memory module 116 may provide non-volatile storage, such as flash memory, for one or more of the processing system 120, controller module 112, I/O module 114, and/or the PMU 118. The memory module 116 may include a cache memory to provide temporary storage of information to enhance processing speed of the SoC 100. In some examples, the memory module 116 may be implemented as a universal flash storage (UFS) integrated into the SoC 100, or an external UFS card.

The SoC 100 may include a PMU 118 configured to manage voltages (e.g., retention, nominal, or off) on one or more core logic voltage rails (e.g., voltage rails configured to provide power to one or more processors of the processing system 120 and the bus module 110) and memory voltage rails (e.g., power rails configured to provide power to the controller module 112 and the memory module 116). The PMU 118 may also be configured to manage one or more clock sources configured to generate clock signals for one or more processors of the processing system 120 and the bus module 110. As such, PMU 118 may be configured to manage components such as voltage rails, voltage regulators, oscillators, phase-locked loops, peripheral bridges, data controllers, system controllers, access ports, timers, and other similar components used to support the processors and software clients running on the SoC 100, or external to the SoC 100. In some examples, the PMU 118 can be off-chip and external to the SoC 100.

As shown in FIG. 1, the bus module 110 serves multiple clients (e.g., one or more processors of the processing system 120, modules on the SoC 100, and/or applications running thereon). However, the common use of the bus module 110 by the multiple client's results in a steady power drain that can negatively affect user experience when SoC 100 is battery powered. Thus, there is a need to effectively manage power consumption of the bus module 110 in order to improve power efficiency of the SoC 100.

EXAMPLE ARCHITECTURE OF A MULTI-LAYER BUS MODULE

Figure 2:
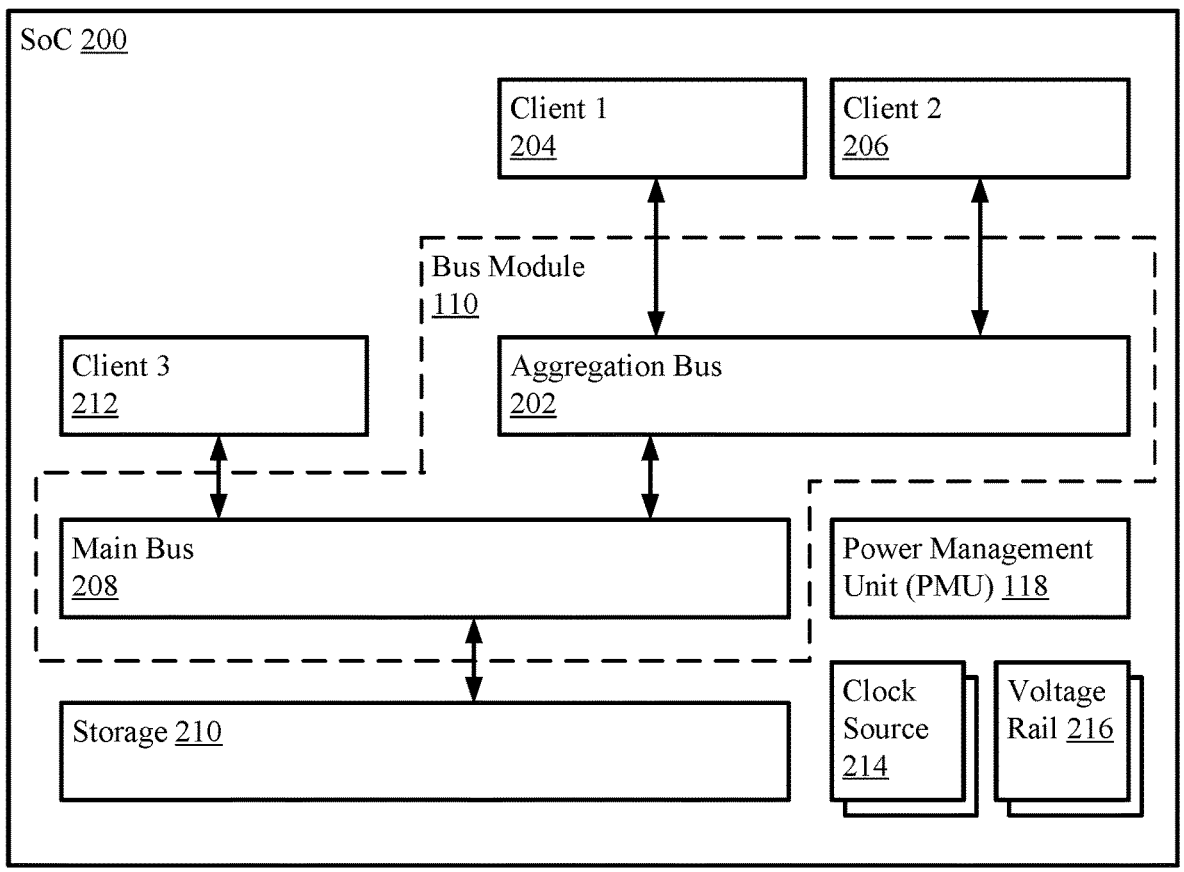
FIG. 2 is block diagram illustrating an exemplary architecture of a multi-layered bus module of the SoC of FIG. 1, in accordance with certain aspects of the present disclosure.

FIG. 2 is block diagram illustrating an exemplary architecture of a multi-layered bus module (e.g., bus module 110 of FIG. 1) of an SoC 200 (e.g., SoC 100 of FIG. 1), in accordance with certain aspects of the present disclosure. Of course, FIG. 2 is merely exemplary in nature, and the specific number and arrangement of elements illustrated in FIG. 2 is not intended to be limiting. In accordance with various aspects of the disclosure, an element, or any portion of an element, or any combination of elements may be implemented with a processing system (e.g., processing system 120 of FIG. 1) that includes one or more processors.

As illustrated in FIG. 2, an aggregation bus 202 (e.g., part of the bus module 110 of FIG. 1) is configured to serve a first client 204 and a second client 206. For example, the aggregation bus 202 may receive memory commands from the first client 204 and the second client 206, and pass the commands to a main bus 208 (e.g., part of the bus module 110 of FIG. 1) which passes the commands to a digital storage 210 (e.g., memory module 116 and/or processor memory 108 of FIG. 1). Similarly, the aggregation bus 202 may receive data addressed to a target client from the main bus 208, and route the data to that client.

The main bus 208 may serve both a third client 212 and the aggregation bus 202 in a manner similar to the service provided by the aggregation bus 202. For example, the main bus 208 may receive memory commands from the third client 212 and the aggregation bus 202, and pass those commands to the digital storage 210. The main bus 208 may also receive data addressed to the third client 212 and the aggregation bus 202 (or a client of the aggregation bus 202), and pass the data to that client or bus. Such communication paths are illustrated in FIG. 2 as bidirectional arrows between the clients, buses, and the storage 210.

In some implementations, aggregation bus 202 and the main bus 208 are part of a network on a chip (NoC), and are constructed of semiconductor intellectual property (IP) elements configured to communicate through a packet-based transport-protocol. Examples of IP elements may include but are not limited to: switches, clock converters, bandwidth regulators, first-in-first-out (FIFO), width converters, endian converters, rate adaptors, power isolators, and any other suitable IP elements. Throughout the disclosure, both the aggregation bus 202 and the main bus 208 may collectively be referred to as "bus elements."

In certain aspects, the SoC 200 includes one or more clock sources 214, such as an oscillating frequency of a crystal oscillator and/or gate signal, configured to provide each of the clients and bus elements an operational clock signal. In one example, a clock source 214 is configured to generate clock signals for the each client and each of the aggregation bus 202 and the main bus 208 in order to synchronize data and command communication between the buses and clients. The SoC 200 may also include one or more voltage rails 216 configured to provide power to each of the buses and clients. In some examples, one or more clients may share a common voltage rail with one or more bus elements (e.g., one or more of the aggregation bus 202 and the main bus 208).

In a further aspect of the disclosure, the SoC 200 may include a power management unit (PMU) (e.g., PMU 118 of FIG. 1). The PMU 118 may be configured to communicate with each of the clients of the bus elements in order to reduce power consumption of the bus elements. For example, the PMU 118 may be configured to control power states of all or portions of the aggregation bus 202 and the main bus 208. In various embodiments, such power states may include various nonoperational, low power (e.g., nominal), and/or operational power levels. For example, the power states may include an off, or non-operational level, without data retention; a retention low power level, which may not be enough power to be an operational level, but may be enough power to retain data; and/or various operational levels, such as high power, medium power, low power, etc.

The PMU 118 may also be configured to control clock modes of all or portions of the aggregation bus 202 and the main bus 208. In various embodiments, such clock modes may include powering on and off one or more clock sources 214, modulating a frequency of a clock signal to reduce or increase the frequency, and/or modulating a duty cycle of the clock signal frequency.

Figure 3:
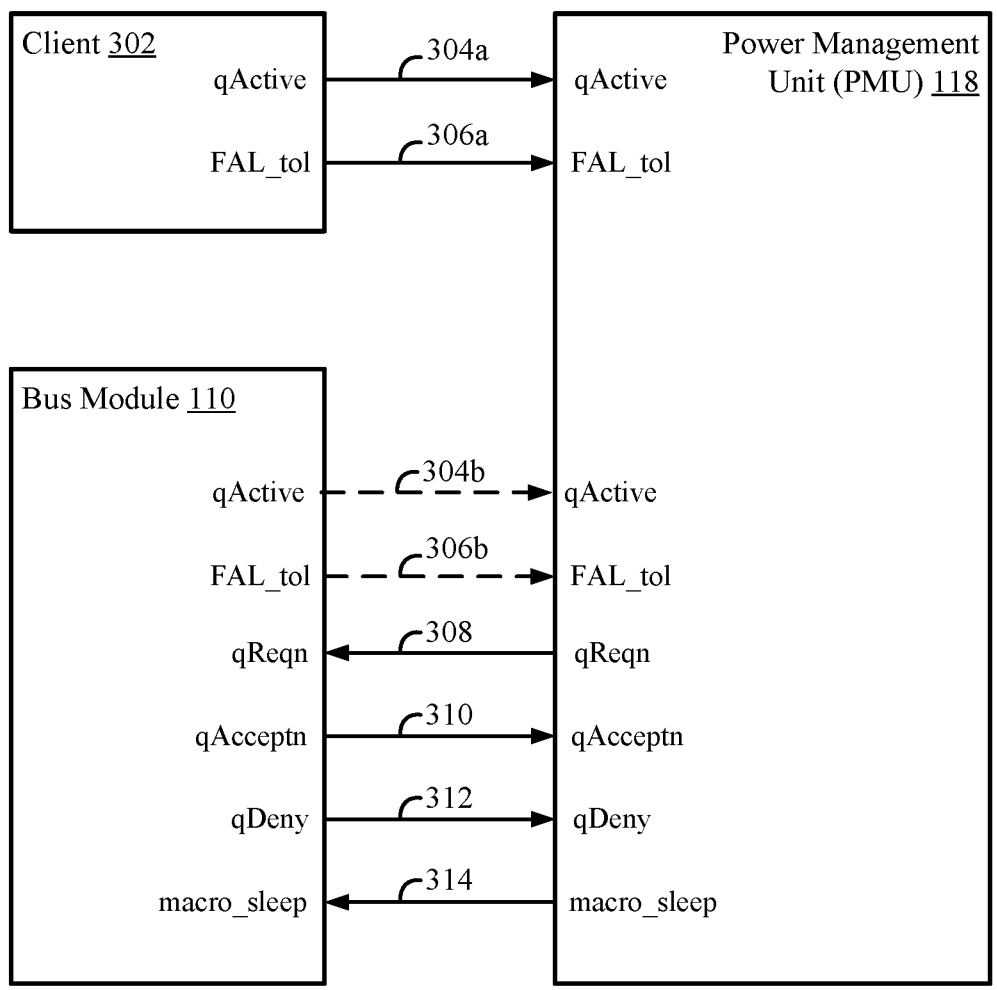
FIG. 3 is a block diagram illustrating exemplary signaling between a power management unit (PMU) and both a client and a bus module, in accordance with certain aspects of the present disclosure.

FIG. 3 is a block diagram illustrating an exemplary signaling between a power management unit (PMU) 118 and both a client 302 (e.g., one or more processors of the processing system 120, modules on the SoC 100, and/or applications running thereon) and a bus module 110. In accordance with various aspects of the disclosure, an element, or any portion of an element, or any combination of elements may be implemented with a processing system (e.g., processing system 120 of FIG. 1) that includes one or more processors.

In certain aspects, the client 302 is configured to provide, and the PMU 118 is configured to receive, signaling (e.g., qActive 304a) indicative of whether the client 302 is active (e.g., the client 302 is requesting a resource) or idle. As such, the qActive 304a signal may be a 1-bit logic signal, where a high (e.g., binary "1") signal indicates the client 302 is active, and a low (e.g., binary "0") signal indicates the client 302 is idle (e.g., inactive, or active but not requiring bus resources), or vice versa. It should be noted that the client 302 may alternatively use a multi-bit qActive 304a signal to indicate whether the client 302 is active or idle.

Client 302 may be configured with relatively low or ultra-low latency requirements for communicating data. Alternatively, or in addition, the client 302 may be required to communicate data that has a relatively low or ultra-low latency requirements. Generally, latency refers to the delay associated with receipt of data at its intended destination. Thus, in a further aspect of the disclosure, the client 302 is configured to transmit, and the PMU 118 is configured to receive, signaling (e.g., FAL_tol 30a) indicative of a first access latency (FAL) tolerance.

In some examples, the FAL tolerance relates to a duration of time that the client 302 can tolerate between requesting resources from the bus module 110 for communication of data, and communication of the data over the bus module 110. That is, the FAL_tol 306a signal may be configured to indicate how much time the client 302 can tolerate for a bus resource (e.g., bus module 110) to be restored from one or more of a reduced power state or clock mode to an operational or active state. In one example, the FAL_tol 306a signal is an encoded signal that the PMU 118 can map to a specific duration of time. In another example, the FAL_tol 306a signal expressly provides the duration of time.

In certain aspects, the bus module 110 may communicate a qActive 304b signal and a FAL_tol 306b signal to the PMU 118. It should be noted that these signals may be optional. For example, with multi-layered bus resources, the PMU 118 may already know that a first bus resource (e.g., aggregation bus 202) is in an idle state if the PMU 118 put that first bus resource into the idle state. Moreover, the PMU 118 may already know the shortest duration of time that the clients of the first bus resource can tolerate for restoration of the first bus resource to an active state.

However, in some examples, the bus module 110 may provide the qActive 304b signal and the FAL_tol 306b signal in the same manner as the client 302. That is, the bus module 110 may be configured to provide, and the PMU 118 configured to receive, signaling (e.g., qActive 304b) indicative of whether the bus module 110 is active (e.g., the bus module requires a shared resource) or idle (e.g., inactive, or active but not requiring bus resources). Similarly, the bus module 110 may be is configured to provide, and the PMU 118 is configured to receive, signaling (e.g., FAL_tol 306b) indicative of a FAL tolerance. In such an example, the PMU 118 may use one or more of the qActive 304b signaling and/or the FAL_tol 306b signaling, along with qActive 304a and/or FAL_tol 306a, to determine whether to put the bus module 110 into an idle state, and the degree to which the bus module 110 is put into the idle state.

In one example, once the PMU 118 has received the qActive 304a signal from the client 302 indicating that the client 302 does not require the first bus resource (e.g., the client 302 is idle, or the client 302 is active but does not need the bus resource), and received the FAL_tol 306a signal indicating the duration of time that the client 302 can tolerate for restoration of the bus module 110, the PMU 118 may provide a qReqn 308 signal to the bus module 110. In some examples, the qReqn 308 signal is configured to notify the bus module 110 that the PMU 118 would like to put the bus module 110 into an idle state. In one example, the qReqn 308 signal may be configured to behave as a request for the bus module 110 to provide the PMU 118 an accept (e.g., qAcceptn 310) or deny (e.g., qDeny 312) signal, indicating whether the bus module 110 accepts or does not accept being put into the idle state. In another example, the PMU 118 may provide the bus module 110 with an indication of the degree to which the bus module 110 will be in an idle state (e.g., the power state and/or clock mode that the bus module 110 will be put into).

If the bus module 110 accepts the being put into an idle state, the bus module 110 may communicate a qAcceptn 310 signal to the PMU 118 indicating that the PMU 118 can put the bus module 110 into the idle state. The PMU 118 may proceed to adjust the voltage rails 216 and/or clock source 214 to put the bus module 110 into the idle state. If the bus module 110 rejects being put into an idle state, the bus module 110 may communicate a qDeny 312 signal to the PMU 118 indicating that the bus module 110 should remain in an active state.

The PMU 118 may also communicate a macro_sleep 314 signal to the bus module 118. The macro-sleep 314 signal may be configured to indicate whether the bus module 110 is going into an idle state with retention (e.g., a micro sleep state), or without retention (e.g., a macro sleep state). For example, if the idle state is characterized by a very low bus power or no bus power state, and/or a bus module 110 recovery time from the idle state to an active state that is longer than a threshold duration, then the PMU 118 may provide a macro_sleep 314 signal that is configured to indicate that the bus module 110 is going into a macro sleep state. That is, in the event of a macro sleep state, any data stored in the bus module 110 will not be retained. Alternatively, the macro_sleep 314 signal may indicate to the bus module 110 that it is entering a micro sleep state, wherein if the idle state is characterized by a relatively higher bus power state, and/or a bus module 110 recovery time from the idle state to an active state that is less than a threshold duration. In the event of a micro sleep state, any data stored in the bus module 110 may be retained.

While the bus module 110 is in an idle state, one or more of the bus module 110 or the client 302 may provide a qActive 304a/304b signal to the PMU 118. In this case, the PMU 118 will restore the bus module 110 to its active state.

EXAMPLE FUNCTIONALITY OF A MULTI-LAYER BUS MODULE

According to certain aspects, a power management unit (PMU) (e.g., such as the PMU 118 in the SoC 100) may be configured to control power and/or clock signaling of one or more bus resources to reduce the amount of power consumed by those resources.

For example, in reference to FIG. 2, the first client 204 and the second client 206 may provide signaling to the PMU 118 indicating that both clients are idle (e.g., not currently requiring bus resources). In the same or separate signaling, each of the first client 204 and the second client 206 may provide the PMU 118 with an indication of an amount of time that the corresponding client can tolerate not having a functional bus resource when that client needs to communicate data. For example, if the bus resource is in a non-functional (e.g., no power) or partially functional (low power and/or gate clock) state, the amount of time provided by the clients corresponds to how much time each client can wait for the bus resource to transition to a functional state for the client to communicate data.

Based on the amount of time, the PMU 118 can determine a degree to which power on the bus resource can be reduced, such that restoring the bus resource to its active state can occur within an amount of time that both clients can tolerate. This provides the PMU 118 with the flexibility to reduce power consumption of the bus resource while preserving the ability of multiple clients to communicate data according to latency and/or reliability requirements that correspond to the data and/or client.

In some embodiments, the PMU 118 may receive signaling indicative of a first plurality of latency durations from a first plurality of clients (e.g., the first client 204 and the second client 206 of FIG. 2), each of the first plurality of latency durations corresponding to one of the first plurality of clients, wherein each of the first plurality of clients is configured to utilize a first bus resource (e.g., the aggregation bus 202 of FIG. 1) for communication of data. For example, the first plurality of latency durations may include a plurality of first access latency signals (FAL) (e.g., FAL_tol 306a/306b of FIG. 3), wherein each of the first plurality of latency durations is configured to indicate to the PMU 118 how much time a corresponding client can tolerate for the aggregation bus 202 to be restored from one or more of a reduced power state or clock mode to an operational state.

In certain aspects, the PMU 118 may receive, from each of the first plurality of clients and the aggregation bus 202, a first plurality of idle signals (e.g., qActive 304a/304b), wherein each of the first plurality of idle signals correspond to one of the first plurality of clients and the aggregation bus 202. For example, the first plurality of idle signals may be configured to indicate to the PMU 118 that the client corresponding to each idle signal is idle, or no longer requesting use of the aggregation bus 202 at the moment.

Each of the first client 204, the second client 206, a third client 212, and an aggregation bus 202 may provide an idle signal to the PMU 118. For example, the first client 204 and the second client 206 may indicate that they no longer require use of the aggregation bus 202. Similarly, the third client 212 and the aggregation bus 202 may indicate that they no longer require use of the main bus 208.

In some embodiments the PMU 118 may select a first latency duration from the first plurality of latency durations based on a determination that the first latency duration is the shortest latency duration of the first plurality of latency durations. For example, once the PMU 118 receives the first plurality of latency durations, it may determine which of the first plurality of latency durations are indicative of the shortest time duration. In some examples, selecting the first latency duration is performed in response to receiving the first plurality of latency durations and the first plurality of idle signals.

For example, PMU 118 may receive signaling from the first client 204 indicating that the first client 204 is in an idle state, as well as signaling from the first client 204 indicating a first latency duration (e.g., an amount of time that the first client 204 can tolerate between a time the first client 204 requests resources from the aggregation bus 202 for communication of data, and a time the first client 204 is able to communicate the data via the aggregation bus 202). Similarly, the PMU 118 may receive signaling from the second client 206 indicating that the second client 206 is in an idle state, as well as signaling from the second client 206 indicating a second latency duration. The PMU 118 may then determine which of the first latency duration and the second latency duration is the shortest (e.g., which of the first client 204 and the second client 206 is most sensitive to aggregation bus 202 latency).

In some embodiments, the PMU 118 may determine a first idle state of a plurality of idle states, the first idle state corresponding to the first latency duration. Here, the first latency duration may correspond to a duration of time that the PMU 118 has determined is the shortest of the first plurality of latency durations. In some examples, the PMU 118 may determine the first idle state based on a mapping of each of the plurality of idle states to a unique latency duration. Such a mapping may be stored in a memory of the PMU 118. Accordingly, the mapping may provide the PMU 118 with an indication of an idle state suitable for the first latency duration.

In one example, the plurality of idle states may include one or more power states and/or one or more clock modes for all or portions (e.g., one or more nodes) of the aggregation bus 202. In one example, if the first latency duration is a relatively long duration, a corresponding idle state may include powering off a clock source (e.g., one or more clock sources 214 of FIG. 2) of the aggregation bus 202 and powering off the aggregation bus 202. Note, that the PMU 118, by powering off the clock source 214 and the aggregation bus 202, puts the aggregation bus 202 into a lowest power state that requires less power than other idle states. However, recovery of the aggregation bus 202 from this lowest power state to an active state requires more time than other idle states. As such, a first idle state that corresponds to powering off the aggregation bus 202 and the clock source 214, may be mapped to a first latency duration having a relatively long duration. This is because a first latency duration having a relatively long duration generally means that the plurality of clients are communicating, using the aggregation bus 202, according to latency requirements that may not be as stringent as other latency requirements.

In another example, if the first latency duration is a relatively short duration, a corresponding idle state may include powering off or gating a clock signal of a clock source 214 of the aggregation bus 202, while maintaining power to the aggregation bus 202. Note that after powering down a clock source of the aggregation bus 202, the PMU 118 can restore the aggregation bus 202 to an active state faster than if both the clock source and the aggregation bus 202 are powered off. As such, a first idle state that corresponds to powering off the clock source 214 but not the aggregation bus 202 may be mapped to a first latency duration having a relatively short duration. This is because a first latency duration having a relatively short duration generally means that at least one of the plurality of clients are using the aggregation bus 202 to communicate data according to latency requirements that may be more stringent than other latency requirements.

In some embodiments, the PMU 118 may transition the aggregation bus 202 from an active state to the first idle state. In some examples, prior to the transitioning, the PMU 118 may require that the aggregation bus 202 provide signaling (e.g., qActive 304b of FIG. 3) to the PMU 118 indicating that it can be put into the first idle state. In some embodiments, the aggregation bus 202 will automatically provide such signaling when it is in an idle state. However, the PMU 118 may also request approval from the aggregation bus 202 to transition the aggregation bus 202 from the active state to the first idle state. In this example, the PMU 118 may proceed with the transition only in response to an acceptance (e.g., qAcceptn 310 signal) by the aggregation bus 202.

The PMU 118 may also be configured to receive an active signal from one or more of the first plurality of clients after the transitioning of the aggregation bus 202, the active signal indicative of a request to communicate data over the aggregation bus 202; and transitioning, by the PMU 118, the aggregation bus 202 from the idle state to the active state in response to receiving the active signal.

For example, if a first client 204 of the first plurality of clients is required to communicate data while the aggregation bus 202 is in the first idle state (e.g., a low-power or no-power state), the first client 204 may provide an active signal or wake-up signaling to the aggregation bus 202. In this example, the aggregation bus 202 may provide signaling back to the first client 204 indicating unavailability, followed by a ready signal when the aggregation bus 202 is restored to an active state. The aggregation bus 202 may also provide signaling requesting the PMU 118 to restore the aggregation bus 202 to an active state in response to the wake-up signaling.

In certain aspects, transitioning the aggregation bus 202 from the idle state to the active state comprises one or more of activating a clock source of the aggregation bus 202, or powering on the aggregation bus 202. As discussed, the PMU 118 may put the aggregation bus 202 into the first idle state by controlling power to one or more of the aggregation bus 202 or clock source 214, and/or by gating the clock signal. As such, when transitioning the aggregation bus 202 from the idle state to the active state, the PMU 118 may restore the aggregation bus 202 to the active state by restoring the power and/or clock signaling.

In certain aspects, each of the plurality of idle states correspond to one or more of a power off state of the aggregation bus 202, or a power off state of a clock source of the aggregation bus 202. In one example, if the first latency duration is shorter than a threshold value, then the first idle state corresponds to the power off state of the clock source; and if the first latency duration is longer than the threshold value, then the first idle state corresponds to the power off state of the aggregation bus 202.

In certain aspects, each of the first plurality of latency durations are: (i) based on a data latency requirement of a corresponding client of the plurality of clients, and (ii) are indicative of an amount of time the corresponding client can tolerate for a transition of the aggregation bus 202 from the first idle state to the active state.

In some embodiments, the PMU 118 may be configured to receive a second latency duration from the aggregation bus 202, and a third latency duration from a third client 212, wherein the aggregation bus 202 and the third client 212 are configured to utilize a second bus resource (e.g., main bus 208) for communication of data. The PMU 118 may then determine which one of: (i) the first plurality of latency durations, (ii) the second latency duration, or (iii) the third latency duration is the shortest latency duration. Based on the determination, the PMU 118 may transition the main bus 208 from an active state to a second idle state of the plurality of idle states, the second idle state corresponding to the determined shortest latency duration.

For example, referring now to FIG. 2, the PMU 118 may have already put the aggregation bus 202 into the first idle state. Next, the PMU 118 may also put the main bus 208 into an idle state (e.g., the second idle state). Initially, the PMU 118 may receive signaling (e.g., qActive 304a/304b of FIG. 3) from a third client 212 indicating that the third client 212 is idle. It should be noted that in this example, the aggregation bus 202 is already in an idle state, thus, it may not be necessary that the PMU 118 may receive signaling from both the third client 212 and the aggregation bus 202. However, in certain other examples, such signaling may come from both the third client 212 and the aggregation bus 202.

The PMU 118 may also receive tolerance signaling (e.g., FAL_tol 306a/306b of FIG. 3) from the third client 212 indicating how long the third client 212 can tolerate for the main bus 208 to be restored from one or more of a reduced power state or clock mode to an operational state. It should be noted that in this example, the PMU 118 determined the idle state of the aggregation bus 202. Accordingly, a FAL_tol 306b signal from the aggregation bus 202 may not be necessary, as the PMU 118 may instead use the shortest duration of time tolerated by the first client 204 and the second client 206. However, in certain other examples, such tolerance signaling may come from both the third client 212 and the aggregation bus 202.

The PMU 118 may then determine a shortest duration that corresponds to the tolerance signaling and/or from a known tolerance (e.g., in the case of the aggregation bus 202). The PMU 118 may then determine an idle state (e.g., the second idle state) that corresponds to the determined shortest duration. That is, in the same manner as described above for the aggregation bus 202, the PMU 118 determines a degree to which power consumed by the main bus 208 is reduced by one or more of a modulation in a voltage rail 216, or a modulation in the clock signal or clock source 214 power. The PMU 118 may then proceed to transition the main bus 208 into the determined idle state.

In some embodiments, the PMU 118 may be configured to restore the main bus 208 and the aggregation bus 202 in a cascading manner. For example, if both the main bus 208 and the aggregation bus 202 are in an idle state, the PMU 118 may an active signal from one or more of the first client 204 or the second client 206. In this example, the active signal is indicative of a request to communicate data over the first shared resource by one or more of the first client 204 or the second client 206. In response to receiving the active signal, the PMU 118 may first transition the main bus 208 from its idle state to an active state. Then, once the main bus 208 is in an active state, the PMU 118 may proceed to transition the aggregation bus 202 from its idle state to an active state. In some examples, transitioning the aggregation bus 202 to an active state may begin in response to a determination by the PMU 118 that the second shared resource is in the active state.

Although the examples provided apply to a PMU 118 configured to control the degree to which a bus resource (e.g., bus module 110) is put into an idle mode, it can be appreciated that the PMU 118 may also control the degree to which other shared resources on the SoC 100—in addition to, or as an alternative to the bus resource—are put into an idle mode.

For example, the other shared resources may include shared aspects of the memory module 116 of FIG. 1. For example, the memory module 116 may include memory mappers, memory controllers, encryption units, and any other suitable memory component. Here, the memory mapper may be configured to translate the logical address of a data element into a physical address including a row address and a column address to a particular portion of a memory. The memory controller may be configured to access memory in response to a memory access request from one or more clients. The encryption unit may be configured to implement SHA-1, MD-5, or some other hash function to encrypt data stored on the memory. In some examples, the other shared resources may include memory resources. For example, any memory resources that can be shared between multiple clients may be put into an idle state by the PMU 118.

In some examples, the other shared resources may include shared aspects of the input/output module 114 of FIG. 1. For example, the I/O module 114 may include physical I/O pin(s), high speed I/O interface(s), or any other suitable hardware and software communication resources.

Although the examples provided apply to a PMU 118 configured to control the degree to which a shared resource is put into an idle mode via control over a power state (e.g., control of a voltage rail 216) or clock mode (e.g., control of a clock source 214), it can be appreciated that the PMU 118 may also control other aspects on the SoC 100—in addition to, or as an alternative to the clock source(s) 214 and voltage rail(s) 216—to control how the shared resource is put into an idle mode. For example, the PMU 118 may also control power and/or clock signaling to calibration circuits, timing circuits, current references, bias circuits, termination circuits, and any other suitable elements of the SoC 100.

For example, a calibration circuit may be configured to provide appropriate I/O operation over process, voltage, and temperature variations (PVT) in the SoC 100. In this example, power and/or clock signaling for such calibration circuitry may be reduced or eliminated. In another example, the timing circuit may be configured to time operations of other elements of the circuit, including analog to digital (ADC) and digital to analog (DAC) circuits, communications over a bus resource, etc. In another example, the current reference drive other aspects of the SoC 100, including buffers, memory, registers, etc., and may be in the form of a programmable counter coupled to a clock source 214. In another example, the bias circuit may be comprised of a resistor and diode, and configured to disable/enable a switch or transistor.

Figure 4:
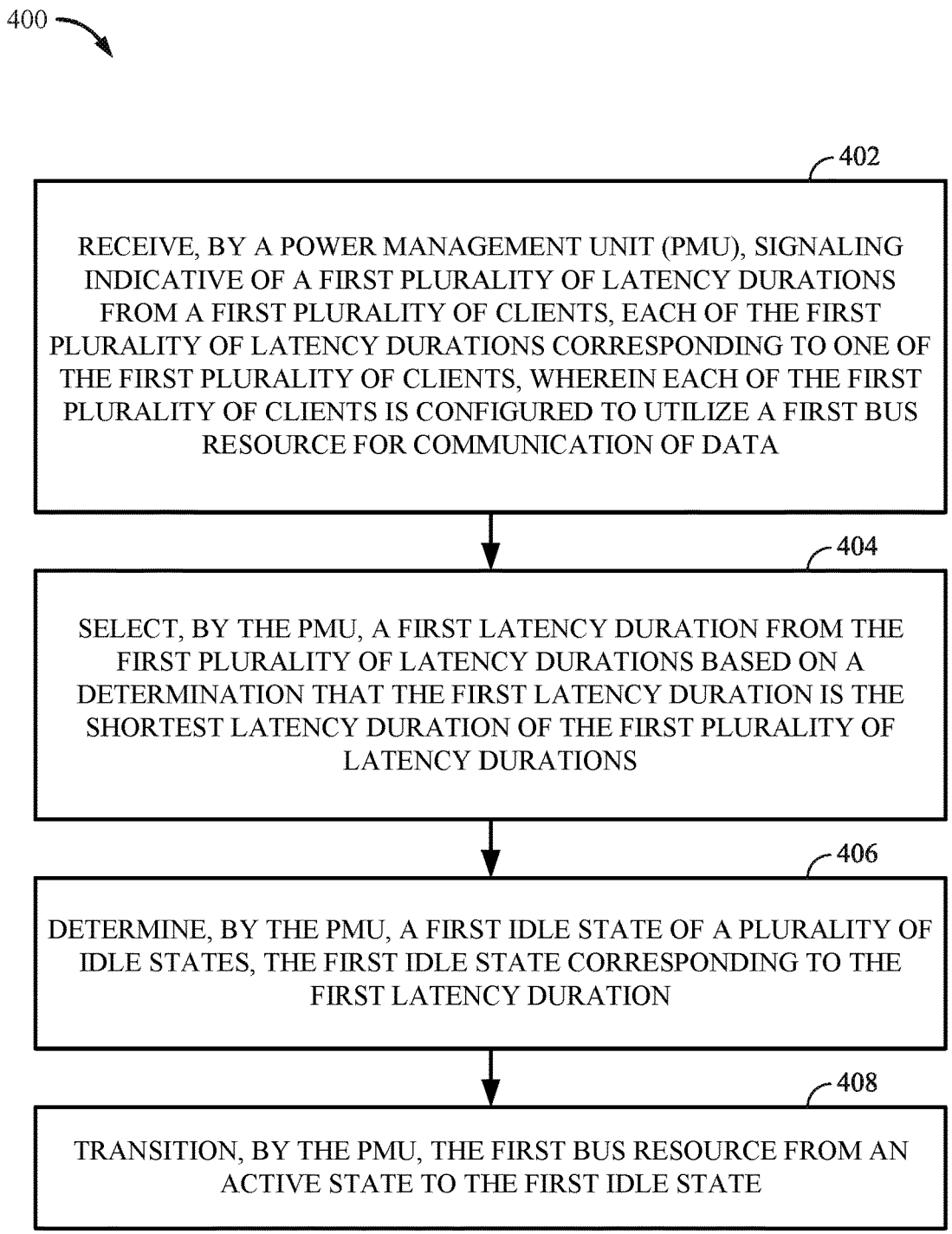
FIG. 4 is a flow diagram illustrating an example process for active power management of bus resources in accordance with certain aspects of the present disclosure.

FIG. 4 is a flow diagram illustrating example operations 400 for wireless communication, in accordance with certain aspects of the present disclosure. The operations 400 may be performed, for example, by a power management unit (PMU) (e.g., such as the PMU 118 of FIGS. 1-3). Operations 400 may be implemented as software components that are executed and run on one or more processors. In certain aspects, the transmission and/or reception of signals by the PMU 118 may be implemented via a bus interface (e.g., bus module 110 of FIGS. 1 and 3).

The operations 400 may begin, at block 402, by receiving, by a power management unit (PMU), signaling indicative of a first plurality of latency durations from a first plurality of clients, each of the first plurality of latency durations corresponding to one of the first plurality of clients, wherein each of the first plurality of clients is configured to utilize a first bus resource for communication of data.

The operations 400 may proceed to block 404 by selecting, by the PMU, a first latency duration from the first plurality of latency durations based on a determination that the first latency duration is the shortest latency duration of the first plurality of latency durations.

The operations 400 may proceed to block 406 by determining, by the PMU, a first idle state of a plurality of idle states, the first idle state corresponding to the first latency duration.

The operations 400 may proceed to block 408 by transitioning, by the PMU, the first bus resource from an active state to the first idle state.

In certain aspects, receiving the first plurality of latency durations further comprises receiving, by the PMU from each of the first plurality of clients and the first bus resource, a first plurality of idle signals; wherein each of the first plurality of idle signals correspond to one of the first plurality of clients and the first bus resource; and wherein selecting the first latency duration is performed in response to receiving the first plurality of latency durations and the first plurality of idle signals.

In certain aspects, the operations 400 include receiving, by the PMU, an active signal from one or more of the first plurality of clients after the transitioning of the first bus resource, the active signal indicative of a request to communicate data over the first bus resource; and transitioning, by the PMU, the first bus resource from the idle state to the active state in response to receiving the active signal.

In certain aspects, transitioning the first bus resource from the idle state to the active state comprises one or more of activating a clock source of the first bus resource, or powering on the first bus resource.

In certain aspects, each of the plurality of idle states correspond to one or more of a power off state of the first bus resource, or a power off state of a clock source of the first bus resource.

In certain aspects, if the first latency duration is shorter than a threshold value, then the first idle state corresponds to the power off state of the clock source; and if the first latency duration is longer than the threshold value, then the first idle state corresponds to the power off state of the first bus resource.

In certain aspects, each of the first plurality of latency durations are: (i) based on a data latency requirement of a corresponding client of the plurality of clients, and (ii) are indicative of an amount of time the corresponding client can tolerate for a transition of the first bus resource from the first idle state to the active state.

In certain aspects, the operations 400 include receiving, by the PMU: a second latency duration from the first bus resource; and a third latency duration from a first client, wherein the first bus resource and the first client are configured to utilize a second bus resource for communication of data; determining, by the PMU, which one of the first plurality of latency durations, the second latency duration, or the third latency duration is the shortest latency duration; and transitioning, by the PMU, the second bus resource from an active state to a second idle state of the plurality of idle states, the second idle state corresponding to the determined shortest latency duration.

ADDITIONAL CONSIDERATIONS

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for" or simply as a "block" illustrated in a figure.

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. The software may be stored on non-transitory computer-readable medium included in the processing system.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method of managing power on a system on a chip (SoC), the method comprising:
    receiving, by a power management unit (PMU), signaling indicative of a first plurality of latency durations from a first plurality of clients, each of the first plurality of latency durations corresponding to one of the first plurality of clients, wherein each of the first plurality of clients is configured to utilize a first shared resource for communication of data;
    selecting, by the PMU, a first latency duration from the first plurality of latency durations based on a determination that the first latency duration is a first shortest latency duration of the first plurality of latency durations;
    determining, by the PMU, a first idle state of a plurality of idle states, the first idle state corresponding to the first latency duration; and
    transitioning, by the PMU, the first shared resource from an active state to the first idle state.

2. The method of claim 1, further comprising receiving, by the PMU, from each of the first plurality of clients and from the first shared resource, a first plurality of idle signals;
    wherein each of the first plurality of idle signals corresponds to one of the first plurality of clients and corresponds to the first shared resource; and
    wherein selecting, by the PMU, the first latency duration is performed in response to receiving the signaling indicative of the first plurality of latency durations and in response to receiving the first plurality of idle signals.

3. The method of claim 1, further comprising:
    receiving, by the PMU, an active signal from one or more of the first plurality of clients after the transitioning, by the PMU, of the first shared resource from the active state to the first idle state, the active signal indicative of a request to communicate data over the first shared resource; and
    transitioning, by the PMU, the first shared resource from the first idle state to the active state in response to the PMU receiving the active signal.

4. The method of claim 3, wherein transitioning the first shared resource from the first idle state to the active state comprises one or more of activating a clock source of the first shared resource, or powering on the first shared resource.

5. The method of claim 1, wherein the plurality of idle states comprises one or more of a power off state of the first shared resource, and a power off state of a clock source of the first shared resource.

6. The method of claim 5, wherein:
    if the first latency duration is shorter than a threshold value, then the first idle state corresponds to the power off state of the clock source; and
    if the first latency duration is longer than the threshold value, then the first idle state corresponds to the power off state of the first shared resource.

7. The method of claim 1, wherein each of the first plurality of latency durations are: (i) based on a data latency requirement of a corresponding client of the plurality of clients, and (ii) are indicative of an amount of time the corresponding client can tolerate for a transition of the first shared resource from the first idle state to the active state.

8. The method of claim 1, further comprising:
    receiving, by the PMU:
        signaling indicative of a second latency duration from the first shared resource; and
        signaling indicative of a third latency duration from a first client, wherein the first shared resource and the first client are configured to utilize a second shared resource for communication of data;
    determining, by the PMU, which one of the first plurality of latency durations, the second latency duration, or the third latency duration is a second shortest latency duration; and
    transitioning, by the PMU, the second shared resource from the active state to a second idle state of the plurality of idle states, the second idle state corresponding to the determined second shortest latency duration.

9. The method of claim 8, further comprising:
    receiving, by the PMU, an active signal from one or more of the first plurality of clients after the transitioning of the first shared resource to the first idle state and the second shared resource to the second idle state, the active signal indicative of a request to communicate data over the first shared resource;
    transitioning, by the PMU, the second shared resource from the second idle state to the active state in response to the PUM receiving the active signal; and
    transitioning, by the PMU, the first shared resource from the first idle state to the active state in response to a determination that the second shared resource is in the active state.

10. A power management unit (PMU), comprising:
    a memory; and
    a processor communicatively coupled to the memory, the processor configured to:
        receive signaling indicative of a first plurality of latency durations from a first plurality of clients, each of the first plurality of latency durations corresponding to one of the first plurality of clients, wherein each of the first plurality of clients is configured to utilize a first shared resource for communication of data;
        select a first latency duration from the first plurality of latency durations based on a determination that the first latency duration is a first shortest latency duration of the first plurality of latency durations;
        determine a first idle state of a plurality of idle states, the first idle state corresponding to the first latency duration; and
        transition the first shared resource from an active state to the first idle state.

11. The PMU of claim 10, wherein the processor, being configured to receive the signaling indicative of the first plurality of latency durations, is further configured to receive, from each of the first plurality of clients and the first shared resource, a first plurality of idle signals;
    wherein each of the first plurality of idle signals corresponds to one of the first plurality of clients and corresponds to the first shared resource; and
    wherein selecting the first latency duration is performed in response to receiving the signaling indicative of the first plurality of latency durations and in response to receiving the first plurality of idle signals.

12. The PMU of claim 10, wherein the processor is further configured to:
    receive an active signal from one or more of the first plurality of clients after the transitioning of the first shared resource from the active state to the first idle state, the active signal indicative of a request to communicate data over the first shared resource; and
    transition the first shared resource from the first idle state to the active state in response to receiving the active signal.

13. The PMU of claim 10, wherein the processor, being configured to transition the first shared resource from the first idle state to the active state is further configured to activate a clock source of the first shared resource, or power on the first shared resource.

14. The PMU of claim 10, wherein the plurality of idle states comprises one or more of a power off state of the first shared resource, and a power off state of a clock source of the first shared resource.

15. The PMU of claim 14, wherein:
    if the first latency duration is shorter than a threshold value, then the first idle state corresponds to the power off state of the clock source; and
    if the first latency duration is longer than the threshold value, then the first idle state corresponds to the power off state of the first shared resource.

16. The PMU of claim 10, wherein each of the first plurality of latency durations are: (i) based on a data latency requirement of a corresponding client of the plurality of clients, and (ii) are indicative of an amount of time the corresponding client can tolerate for a transition of the first shared resource from the first idle state to the active state.

17. The PMU of claim 10, wherein the processor is further configured to:
    receive:
        signaling indicative of a second latency duration from the first shared resource; and
        signaling indicative of a third latency duration from a first client, wherein the first shared resource and the first client are configured to utilize a second shared resource for communication of data;
    determine which one of the first plurality of latency durations, second latency duration, or the third latency duration is a shortest latency duration; and
    transition the second shared resource from an active state to a second idle state of the plurality of idle states, the second idle state corresponding to the determined shortest latency duration.

18. A non-transitory computer-readable storage medium that stores instructions that when executed by a processor of an apparatus cause the apparatus to perform a method for active power management of shared resources on a system on a chip (SoC), the method comprising:
    receiving signaling indicative of a first plurality of latency durations from a first plurality of clients, each of the first plurality of latency durations corresponding to one of the first plurality of clients, wherein each of the first plurality of clients is configured to utilize a first shared resource for communication of data;
    selecting a first latency duration from the first plurality of latency durations based on a determination that the first latency duration is a first shortest latency duration of the first plurality of latency durations;
    determining a first idle state of a plurality of idle states, the first idle state corresponding to the first latency duration; and
    transitioning the first shared resource from an active state to the first idle state.

19. The non-transitory computer-readable storage medium of claim 18 further comprises receiving, from each of the first plurality of clients and the first shared resource, a first plurality of idle signals;
    wherein each of the first plurality of idle signals corresponds to one of the first plurality of clients and corresponds to the first shared resource; and
    wherein selecting the first latency duration is performed in response to receiving the signaling indicative of the first plurality of latency durations and in response to receiving the first plurality of idle signals.

20. The non-transitory computer-readable storage medium of claim 18, wherein the method further comprises:
    receiving an active signal from one or more of the first plurality of clients after the transitioning of the first shared resource from the active state to the first idle state, the active signal indicative of a request to communicate data over the first shared resource; and
    transitioning the first shared resource from the first idle state to the active state in response to receiving the active signal.

21. The non-transitory computer-readable storage medium of claim 20, wherein transitioning the first shared resource from the first idle state to the active state comprises one or more of activating a clock source of the first shared resource, or powering on the first shared resource.

22. The non-transitory computer-readable storage medium of claim 18, wherein the plurality of idle states comprises one or more of a power off state of the first shared resource, and a power off state of a clock source of the first shared resource.

23. The non-transitory computer-readable storage medium of claim 22, wherein:
    if the first latency duration is shorter than a threshold value, then the first idle state corresponds to the power off state of the clock source; and
    if the first latency duration is longer than the threshold value, then the first idle state corresponds to the power off state of the first shared resource.

24. The non-transitory computer-readable storage medium of claim 18, wherein each of the first plurality of latency durations are: (i) based on a data latency requirement of a corresponding client of the plurality of clients, and (ii) are indicative of an amount of time the corresponding client can tolerate for a transition of the first shared resource from the first idle state to the active state.

25. The non-transitory computer-readable storage medium of claim 18, wherein the method further comprises:
    receiving:
        signaling indicative of a second latency duration from the first shared resource; and
        signaling indicative of a third latency duration from a first client, wherein the first shared resource and the first client are configured to utilize a second shared resource for communication of data;

determining which one of the first plurality of latency durations, second latency duration, or the third latency duration is a shortest latency duration; and transitioning the second shared resource from an active state to a second idle state of the plurality of idle states, the second idle state corresponding to the determined shortest latency duration.

26. A power management unit (PMU), comprising:

means for receiving signaling indicative of a first plurality of latency durations from a first plurality of clients, each of the first plurality of latency durations corresponding to one of the first plurality of clients, wherein each of the first plurality of clients is configured to utilize a first shared resource for communication of data;

means for selecting a first latency duration from the first plurality of latency durations based on a determination that the first latency duration is a first shortest latency duration of the first plurality of latency durations;

means for determining a first idle state of a plurality of idle states, the first idle state corresponding to the first latency duration; and means for transitioning the first shared resource from an active state to the first idle state.

27. The PMU of claim 26 further comprising means for receiving, from each of the first plurality of clients and the first shared resource, a first plurality of idle signals;

wherein each of the first plurality of idle signals corresponds to one of the first plurality of clients and corresponds to the first shared resource; and wherein means for selecting the first latency duration comprises means for responding to receiving the signaling indicative of the first plurality of latency durations and the first plurality of idle signals.

28. The PMU of claim 26, further comprising:

means for receiving an active signal from one or more of the first plurality of clients, wherein the active signal from one or more of the first plurality of client is received after the transitioning of the first shared resource, the active signal indicative of a request to communicate data over the first shared resource; and means for transitioning the first shared resource from the first idle state to the active state in response to receiving the active signal.

29. The PMU of claim 26, wherein the plurality of idle states comprises one or more of a power off state of the first shared resource, and a power off state of a clock source of the first shared resource.

30. The PMU of claim 26, wherein each of the first plurality of latency durations are: (i) based on a data latency requirement of a corresponding client of the plurality of clients, and (ii) are indicative of an amount of time the corresponding client can tolerate for a transition of the first shared resource from the first idle state to the active state.

* * * * *